July 8, 1952 L. P. MORRIS ET AL 2,602,842

RAILROAD COMMUNICATION SYSTEM

Filed June 7, 1949 2 SHEETS--SHEET 1

INVENTORS.
Lloyd P. Morris,
Frank H. Clarke,
BY Foorman L. Mueller
Atty.

July 8, 1952 L. P. MORRIS ET AL 2,602,842

RAILROAD COMMUNICATION SYSTEM

Filed June 7, 1949 2 SHEETS—SHEET 2

INVENTORS.
Lloyd P. Morris,
BY Frank H. Clarke,
Foorman L. Mueller
Atty.

Patented July 8, 1952 2,602,842

UNITED STATES PATENT OFFICE 2,602,842

RAILROAD COMMUNICATION SYSTEM

Lloyd P. Morris, Elmwood Park, and Frank H. Clarke, Chicago, Ill., assignors to Motorola, Inc., Chicago, Ill., a corporation of Illinois Application June 7, 1949, Serial No. 97,672

9 Claims. (Cl. 175—298)

This invention relates to mobile radio communication equipment, particularly as employed in railroad operations.

The conditions under which mobile radio communication equipment is used in railroading are such as to impose many restrictions upon the design of such equipment. Usually the equipment must be located where the available space is limited, and it is subjected to almost continual shock and vibration while the train is in motion. The personnel who handle and operate such equipment are apt to have very little experience and skill in the maintenance thereof. Therefore, simplicity and ruggedness must characterize the design of the equipment, and it should be made as foolproof as possible. Other factors which should be given serious consideration are adequate heat dissipation and protection against corrosion, dust and moisture.

While there are many limitations upon the design of railroad communication equipment, it is essential nevertheless that a high degree of flexibility be inherent in the organization of the equipment. Units which require repair or replacement must be quickly removed and new units installed in their place. From time to time it may be necessary to add equipment for accommodating more channels. This should be done without any extensive wiring changes in the installation. Also, many railroad companies are reluctant to invest in mobile radio communication equipment because the art is still in its infancy, and there is a fear that obsolescence of the units may necessitate scrapping whole installations. This reluctance can be overcome only by providing a type of installation which accommodates changes within the various units without necessarily affecting parts of the equipment that are common to all units thereof.

With the foregoing considerations in mind, it is an object of the present invention to provide a novel "building block" arrangement of communication equipment for railroad operations which combines the features of rugged simplicity with flexibility.

Another object is to provide an improved communication system with plug-in transmitter and receiver units that are easily handled and can be replaced readily by non-technical personnel.

A further object is to provide improved vibration-proof means for holding the units in place and establishing electrical connections among the units.

A still further object is to provide transmitting and receiving plug-in units which will fit all holders and which include sturdy dustproof housings to protect the units both in and out of their holders.

A feature of the invention is the provision of improved racks for holding the plug-in units. These racks are of open construction to facilitate the dissipation of heat from the units and are adapted to hold as many plug-in units as may be desired when the installation reaches its ultimate capacity. All electrical connections between units on the same rack are effected through interconnected sockets on the rack, which sockets receive the plugs on the transmitter and receiver units. In addition, the rack may be wired for remote control of the units mounted therein.

Another feature is the provision of pivoted levers on the racks with spring members adapted to bear against the outer ends of the plug-in units for maintaining the plugs seated firmly in their sockets. The levers are engaged by an arm which locks the units in the racks and are released when the arm is unlocked. The levers also actuate break-away devices for pulling the units loose from their sockets when they are to be removed from the rack.

Another feature is the construction of the plug-in units themselves, the chassis of each unit being mounted on a base member having plug provisions thereon and being enclosed by a cover having a handle on it by which the unit may be carried when not in use.

The foregoing and other objects, features and advantages of the invention will be understood better from the following detailed description thereof, taken in connection with the accompanying drawings wherein.

Figures 1, 2, 3:
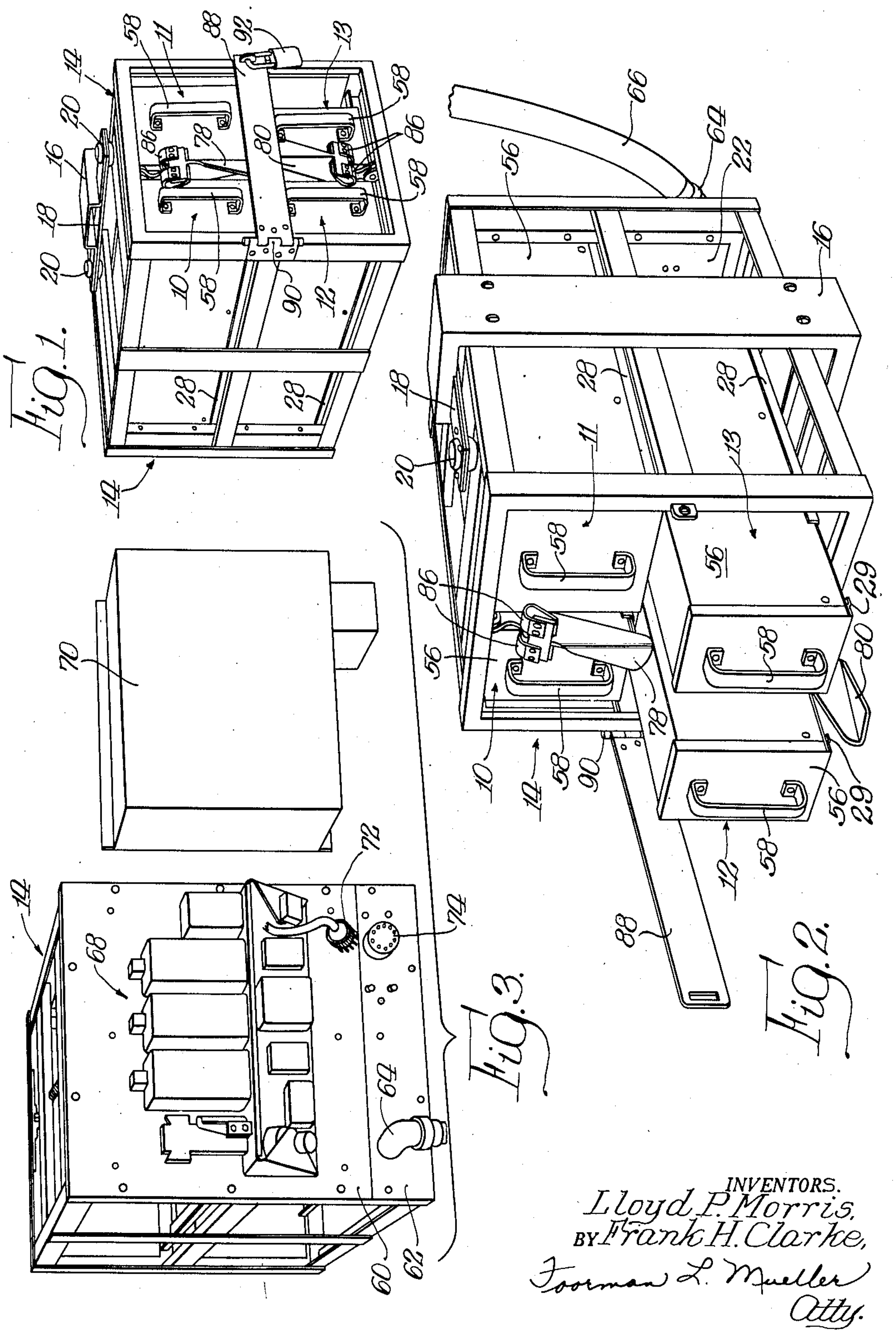
Fig. 1 is a front perspective view of a communication equipment assembly embodying the principles of the invention, the plug-in units being shown locked in the rack.
Fig. 2 is another front perspective view of the same equipment, with the rack unlocked and some of the units partially withdrawn therefrom.
Fig. 3 is a disassembled rear perspective view of a rack provided with remote control facilities.

In the illustrated embodiment of the invention, the rack is designed to hold four plug-in units, for example, a transmitter and three receivers. The rack consists of an open framework on the top, bottom and sides thereof, and it has a solid rear wall with four female sockets arranged thereon to cooperate respectively with the plugs on the various units which are mounted in the rack. Coded pins on the solid rear wall are matched with coded holes in the various units to insure that the proper units are received in the sockets. Permanent wiring among the various units is supported by the rear wall in association with the sockets thereon. There is a protective panel behind the rear wall to cover this wiring, and if desired, additional equipment such as remote control apparatus may be supported by this panel. The rack has provisions for guiding the various plug-in units into cooperation with the respective sockets and a locking bar for holding the units in place within the rack. Levers pivotally mounted on the front part of the rack carry spring members adapted to bear against the front ends of the units. The locking bar, when closed, is adapted to engage these levers and cause spring pressure to be exerted up on the front ends of the units. Disconnecting bars or links pivotally connected to the aforesaid levers extend rearwardly through the rack and are arranged to cooperate with the rear ends of the plug-in units. When the units are to be disconnected from the rack, the levers are tilted outwardly, causing the disconnecting bars to pull the units away from the socket. The units then may be removed individually by hand. The chassis of each plug-in unit is mounted on a base having an upstanding rear wall which carries the male plug that cooperates with one of the female sockets at the rear of the rack. A dustproof cover secured to the base completely encloses the chassis of the unit and the various electrical components mounted thereon. The cover has a handle on it so that the unit may be carried about conveniently when not in the rack.

Referring now to the drawings, the four-unit installation there shown illustrates the building block principle of the invention. The four units 10, 11, 12 and 13 are mounted in two tiers in the rack 14. These units may comprise a three-channel transmitter and three separate receivers, each operating on an individual frequency channel. While the illustrated rack 14 will accommodate four such units, the initial installation may include only two or three of these units, and the others may be added thereto as the system is expanded. For example, one may wish to start with a single-channel transmitter and a single receiver, then later replace the single-channel transmitter with a multiple-channel transmitter and increase the number of receivers accordingly. The disclosed installation is very flexible in this respect, and readily permits expansion of the existing system up to the maximum number of units which can be accommodated therein without necessitating replacement of the installation as a whole.

The rack 14 is shock-mounted in a suitable manner. Assuming that the installation is mounted on a vertical supporting wall, a rigid supporting member such as 16, Figs. 1 and 2, is employed. The member 16 has a vertical portion adapted for attachment to the vertical supporting wall (not shown) and horizontal legs straddling the rack 14 above and below the same. Interposed between each of these legs and the adjacent portion of the rack 14 is a strong leaf or spring member 18, the central portion of which engages the member 16 and the ends of which are spaced therefrom. Rubber shock mounts 20 carried at the ends of each member 18 engage the rack 14. Modified shock mounting provisions may be employed where the rack is being supported by a horizontal surface, and the mounting positions for different styles of racks may differ.

The rack 14 is open at the front end thereof, and it consists essentially of an open framework on its front, bottom and sides. The rear of the rack 14 is closed by a solid wall 22 (best shown in Fig. 4) on which are mounted the female sockets 23, 24, 25 and 26 that respectively receive the plug-in units 10, 11, 12 and 13. Horizontally extending fixed and adjustable channel members 28 on the rack 14 accurately guide the units into cooperation with the sockets and permit interchanging between units when required. This arrangement permits the use of more than one transmitter, all receivers, etc.

Figure 5:
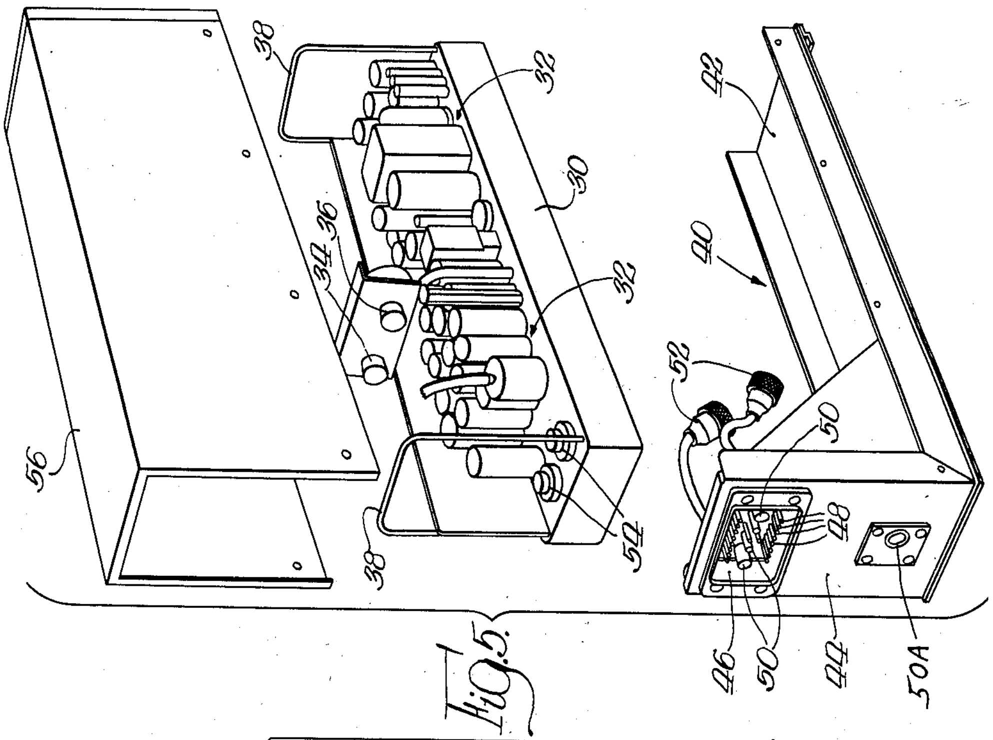
Fig. 5 is a disassembled view of a typical plug-in unit.

The construction of a typical plug-in unit is illustrated in Fig. 5. A chassis 30 supports components of electronic apparatus, generally designated 32, which are arranged in a plurality of stages for effecting a conversion between audio-frequency modulation on the one hand and radio-frequency modulated signals on the other hand. In the case of a transmitter, audible intelligence is introduced to the unit through the medium of a microphone (not shown) and modulates the radio-frequency energy generated by the transmitter unit. In the case of a receiver, the modulated radio frequency signals are picked up by an antenna (not shown) and introduced to the input side of the receiver, and the audible intelligence is recovered at the output side thereof. Controls, such as a volume control 34 and a squelch control 36, also may be supported by the chassis 30. Reinforcing rods 38 mounted on the end of the chassis 30 enable the chassis to be supported on its side without damage to the components 32 when the unit is being serviced.

The chassis 30 is mounted in the base 40 having a channel-shaped bottom plate 42 on which the chassis 30 rests, being secured thereto in any suitable fashion. An upstanding front plate 44 on the base 40 carries the male plug 46 which cooperates with one of the female sockets 23, 24, 25 or 26 on the rack 14. In addition to the pins 48 through which electrical connections are effected, the plug also has pins 50 which are matched with corresponding holes in the appropriate socket on the rack. This prevents the contact pins on the units from being damaged when being plugged into the sockets. These contact sockets are all aligned (for both transmitter and receivers) to the left hand slide rail 28 so that socket and plug positions do not have to be changed when making up different transmitter and receiver combinations. This particular item provides much greater flexibility and utility. Electrical connections from the plug 46 to the chassis components 32 are effected through mating connectors 52 and 54 on the base 40 and chassis 30, respectively. Coded sockets 50A (Fig. 5) are matched to adjustable code pins 50B (Fig. 4) to prevent improper unit insertions by inexperienced personnel.

Each of the plug-in units is provided with a dustproof cover 56, open at its rear end and closed at the front end thereof, which encloses the chassis 30 and its components 32. The cover 56 is secured to the base 40, the bottom plate 42 and rear plate 44 of which complete the enclosure for the chassis 30. The cover 56 is sturdy, and on its front end it has a handle 58 (Figs. 1 and 2) by which each plug-in unit can be carried when it is not in the rack.

Figure 4:
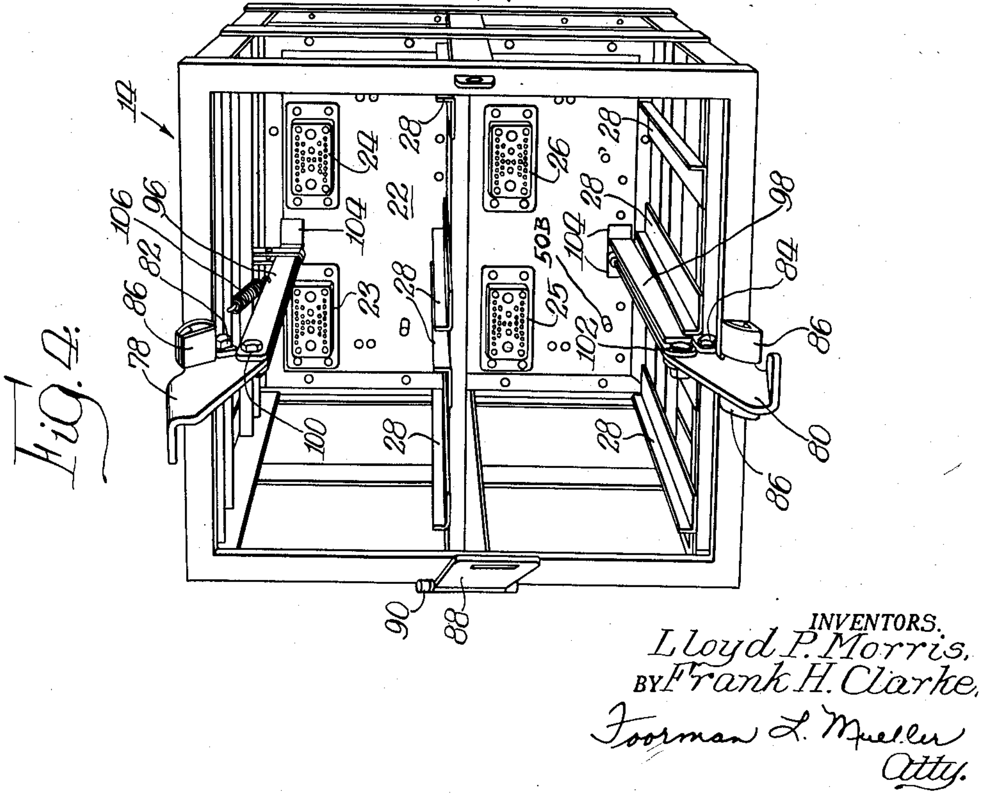
Fig. 4 is a front perspective view of a rack from which the plug-in units have been removed.

At the extreme rear end of the rack 14 behind the wall 22, Fig. 4, there is a panel such as 60, Fig. 3, which covers the wiring on the rear face of the wall 22. Below this panel 60 is a strip 62 on which is mounted a connector 64 to which a power cable as 66, Fig. 2, may be attached. The wiring for making power connections to the various sockets on the rack is disposed in the space between the rear wall 22 and the panel 60. If the installation is to be operated by remote control, the appropriate remote control equipment 68, Fig. 3, is mounted on the rear face of the panel 60, and a cover 70 for this equipment is secured to said panel. Connections from the equipment 68 to the sockets on the rack are effected through a plug 72 which is received in a socket 74 on the strip 62.

Small levers 78 and 80, Figs. 2 and 4, are pivotally mounted on the rack 14 at the front end thereof, the lever 78 being located at the top of the rack 14 intermediate the units 10 and 11, and the other lever 80 being located at the bottom of the rack 14 intermediate the units 12 and 13. The pivotal mountings for these levers are indicated at 82 and 84, respectively. Each of the levers 78 and 80 has a pair of bowed spring members 86 mounted thereon, which spring members are adapted to cooperate with the front ends of adjacent units such as 10 and 11 or 12 and 13. When the units have been inserted in the rack 14, the levers 78 and 80 are swung to their closed positions, bringing the free ends of these levers to the middle of the rack 14. This holds the units in the desired positions in the rack with the rear ends thereof being held in position by the electrical plugs and sockets and by the coding pins and sockets, and the front ends being held in position by the flanges 29 on the units which fit under the ends of the channel members 28 of the rack.

A horizontally extending locking bar or arm 88 is hinged at 90 to one side of the frame 14 at the front end thereof, and when this bar 88 is swung into its closed position, it engages the free ends of the levers 78 and 80 and pushes these levers rearwardly. The spring members 86 thereupon are forced against the front ends of the units 10 to 13, taking up any loose play and causing these units to remain seated firmly in their respective sockets 23 to 26. The locking bar 88 is secured in its closed position by a padlock 92 as shown in Fig. 1, to prevent the unauthorized removal of the plug-in units. As an added precaution against removal, the bar 88 is made sufficiently wide so that it overlaps portions of the various units 10 to 13, so that the spring members 86 alone are not relied upon for this purpose. The spring members 86 prevent any looseness of the plugs on the units 10 to 13 in their sockets 23 to 26 despite the severe vibrations to which the equipment is subjected.

Horizontal links or disconnecting bars 96 and 98, Fig. 4, are supported for sliding movement at the top and bottom of the rack 14 intermediate the pairs of units 10 and 11, and 12 and 13, respectively. At their front ends the links 96 and 98 are pivotally connected (as indicated at 100 and 102, respectively) to the levers 78 and 80. As the levers 78 and 80 are pivoted about their fulcrums 82 and 84, the links 96 and 98 slide horizontally. At the rear end of each link is a cross member 104 which engages the rear ends of the adjoining units such as 10 and 11 or 12 and 13. When any of these units is to be removed from the rack, the corresponding lever 78 or 80 is swung forwardly, pulling the associated link 96 or 98 forwardly. The cross member 104 engages the rear edge of the unit in question, and as the bar 96 or 98 moves ahead, the unit is pulled loose from its socket in the rack 14. The levers 78 and 80 afford a high mechanical advantage which makes the removal of the plug-in units very easy. Otherwise a very strong pull on the handles of these units would be required, possibly subjecting the unit to damage. A spring 106 acting upon the link 96 tends to urge the lever 78 into its uppermost position, as shown in Fig. 4, so that it is not necessary to lift this lever by hand when a unit is to be inserted in the upper tier of the rack 14. The lower lever 80 is urged by gravity into its open position as shown.

As is apparent from the foregoing description, the illustrated embodiment of the invention fulfills the objects of the invention stated above. The equipment is shock-proof and vibration-proof, and the units are well protected from damage. The open racks 14 expedite the dissipation of heat of the units. All wiring between the units is concealed within the rack 14. It is easy to install and remove the various units, and once in place, they are securely held against unauthorized removal. Flexibility and interchangeability are outstanding characteristics of the invention, as explained above, and these features greatly expedite the servicing of the equipment. Numerous advantages, not specifically mentioned herein, may occur to those skilled in the art.

While the embodiment of the invention disclosed herein is believed at present to be the preferred one, modifications thereof may be desirable, and the invention therefore is not confined to the details shown. The appended claims are intended to cover all modifications which come within the true spirit and scope of the inventive principles set forth herein.

We claim:

1. Radio communication equipment comprising a plurality of plug-in units for transmitting and receiving radio signals, a rack for holding said units, said units and said rack having cooperating plug and socket means thereon providing interconnection between said units, said rack including resilient means for holding said units in place therein with said plug and socket means interconnected, a rigid member for supporting said rack, and resilient shock-absorbing members interposed between said rigid member and said rack, each of said resilient members having end portions engaging said rack and a central portion engaging said rigid member.

2. Radio communication equipment comprising a plurality of plug-in units, a rack for holding any desired number of said units up to a given maximum number, said units and said rack having cooperating plug and socket provisions thereon, pivoted levers mounted on said rack, each of said levers having a resilient portion adapted to engage one of said units, and a pivoted locking arm on said rack engageable with said levers to hold said levers in position to exert resilient pressure on said units to thereby firmly support said units and to prevent loosening of said units due to vibrations.

3. Radio communication equipment comprising a plurality of plug-in units having front and rear portions, a rack for holding any desired number of said units up to a given maximum number, said rack having a rear wall with socket provisions thereon for receiving said rear portions of said units, pivoted levers mounted on said rack, said levers having resilient portions for engaging the front portions of said units, and a hinged locking arm on said rack engageable with said levers to exert resilient pressure through said levers on the front portions of said units while the units are mounted in the rack.

4. Radio communication equipment comprising a plurality of elongated units having front and rear ends, each of said units having on said rear end thereof a plug, a rack for holding any desired number of said units up to a given maximum number, said rack having a rear wall with sockets thereon for respectively receiving the plugs on said units, locking means on said rack including pivoted levers adapted to exert pressure on the front ends of said units while the same are locked in said rack, and links extending from said levers to the rear wall of said rack and including provisions thereon for engaging the rear ends of said units, said levers being operable to draw said units forward and disconnect the plugs thereon from said sockets in said rack.

5. Radio communication equipment including in combination, a plurality of plug-in units, a rack for holding a plurality of said units, said units and said rack having cooperating plug and socket provisions thereon for making electrical and supporting connection therebetween, said plug and socket provisions including coded portions which permit installation of said units in said rack in predetermined positions only, a pivoted lever mounted on said rack, said lever having a plurality of resilient portions for individually engaging a plurality of said units, and a pivoted locking arm on said rack engageable with said lever to hold said lever in a position to exert resilient pressure on said units thereby to prevent loosening of said units in said rack due to vibrations.

6. Radio communication equipment including in combination, at least one plug-in unit, a rack for holding said unit, said unit and said rack having cooperating plug and socket provisions thereon for making electrical and supporting connection therebetween, a pivoted lever mounted on said rack, said lever having a resilient portion for engaging said unit when said unit is positioned in said rack, and a pivoted locking arm on said rack engageable with said lever to hold said lever in a position to exert resilient pressure on said unit thereby to prevent loosening of said unit in said rack due to vibrations.

7. Radio communication equipment comprising a plurality of units having front and rear ends, each of said units having plug means on the rear end thereof, a rack for holding a plurality of said units having an open end for receiving said units and including channel members forming guideways for supporting said units, said rack having a rear wall with socket means thereon for individually receiving said plug means of said units when said units are positioned in said rack, said units including flanges on the front end thereof for engaging said channel members when said units are positioned in said rack, and members supported on said rack including resilient means engageable with the front ends of said units for holding said units in position in said rack, whereby said units are held in position in said rack at the rear ends thereof by said plug and socket means and at the front ends thereof by said flanges and said channel members.

8. Radio communication equipment comprising a plurality of units having front and rear ends, each of said units having plug means on the rear end thereof, a rack for holding a plurality of said units having an open end for receiving said units and including channel members forming guideways for supporting said units, said rack having a rear wall with socket means thereon for individually receiving said plug means of said units when said units are positioned in said rack, said units including flanges on the front end thereof for engaging said channel members when said units are positioned in said rack, and locking and releasing means on said rack including pivoted levers for exerting pressure on the front ends of said units for holding said units in position in said rack, said locking and releasing means also including links extending from said levers to said rear wall of said rack and including portions for engaging said rear ends of said units, said levers operating through said links to draw said units forward to withdraw said plug means on said units from said socket means or said rack.

9. Radio communication equipment for use with mobile apparatus wherein severe shocks and vibrations are encountered, said equipment including in combination a plurality of plug-in units, a rugged rack structure for holding any desired number of said units up to a given maximum number, said units and said rack structure having cooperating plug and socket means thereon providing interconnection between said units, said plug and socket means including coding portions which permit connection of said units in said rack in predetermined positions only, means having resilient portions engaging said units for holding the same in position in said rack structure, a rigid supporting member for said rack structure adapted to be mounted on said mobile apparatus, and a pair of resilient shock-absorbing members interposed between said rigid member and said rack structure and each having at least two spaced portions thereof connected to said rack structure and providing a stable support therefor.

LLOYD P. MORRIS.
FRANK H. CLARKE.

REFERENCES CITED

The following references are of record in the file of this patent:

UNITED STATES PATENTS

| Number | Name | Date |
|---|---|---|
| 1,874,935 | Drake | Aug. 30, 1932 |
| 1,901,165 | Jackson | Mar. 14, 1933 |
| 2,077,160 | Wilson | Apr. 13, 1937 |
| 2,151,756 | Fletcher | Mar. 28, 1939 |
| 2,193,115 | Smith | Mar. 12, 1940 |
| 2,273,001 | Mahoney | Feb. 10, 1942 |
| 2,488,372 | Breisch | Nov. 15, 1949 |
| 2,514,246 | Knox | July 4, 1950 |